Sept. 3, 1968    H. A. STOVER    3,400,397
AIRCRAFT POSITION IDENTIFICATION SYSTEM
Filed Sept. 16, 1966
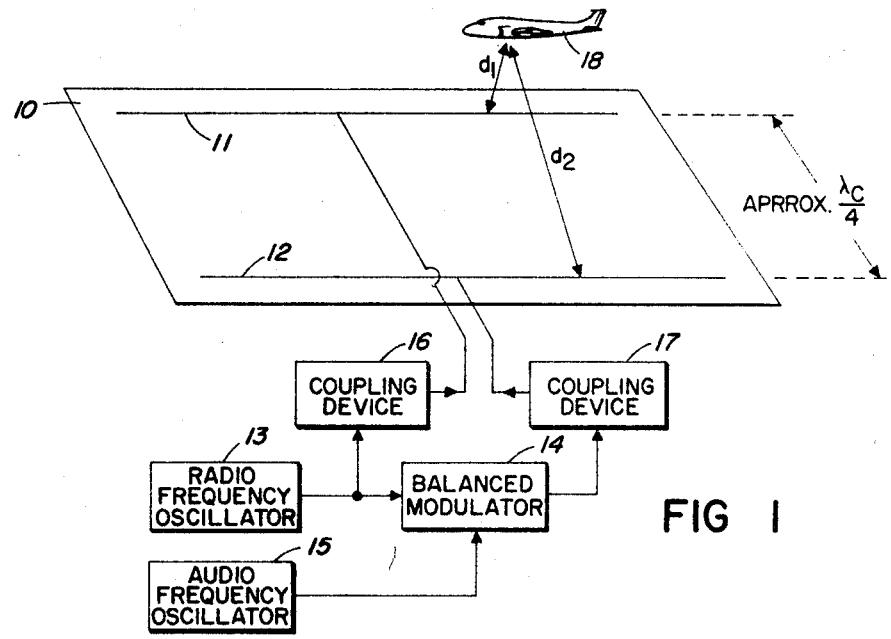
FIG 1
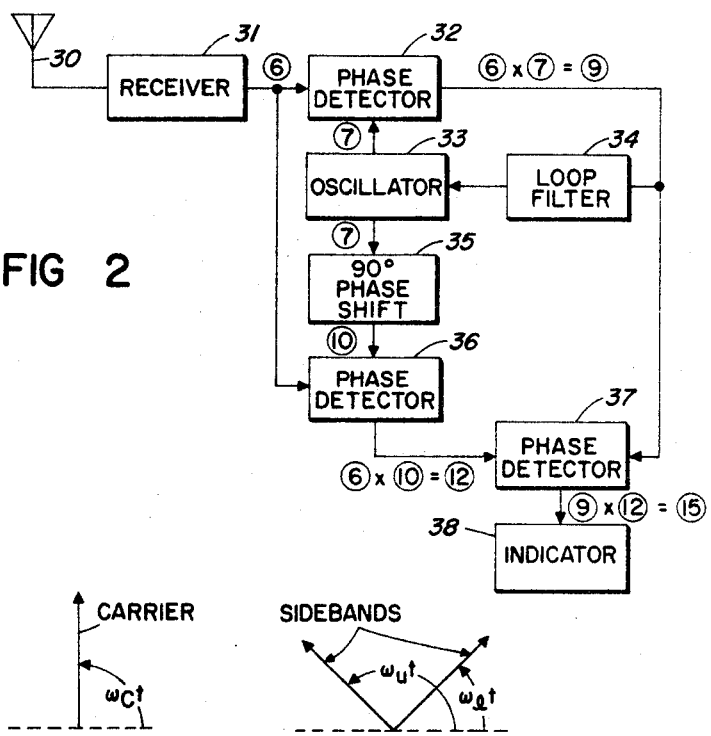
FIG 2
FIG 3(a)    FIG 3(b)
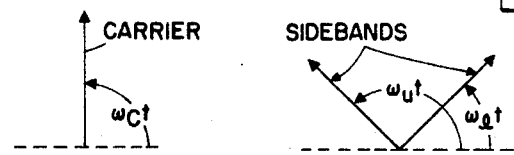
INVENTOR.
HARRIS A. STOVER
BY Mody & Hellocher
ATTORNEYS

United States Patent Office 3,400,397
Patented Sept. 3, 1968

3,400,397
AIRCRAFT POSITION IDENTIFICATION SYSTEM
Harris A. Stover, Cedar Rapids, Iowa, assignor to Collins Radio Company, Cedar Rapids, Iowa, a corporation of Iowa
Filed Sept. 16, 1966, Ser. No. 580,045
5 Claims. (Cl. 343—105)

ABSTRACT OF THE DISCLOSURE

Described is a system which automatically indicates on which side of a plane, which lies between two parallel antennas, that a receiver is located. The system includes a transmitter having two parallel antennas and a receiver capable of indicating the phase relationship between the signals as received from said antennas. The system is capable of automatically providing the directional location of a receiver from a known space plane.

---

This invention relates generally to aircraft position systems and particularly to a system which automatically indicates on which side of a space plane an aircraft is located.

In using aircraft in close support of infantry one important factor is the identification and location of the area where the air strike is intended. In particular it is important to identify the line between friendly and unfriendly areas. In World War II this was accomplished by the placement of a cerise colored panel on the ground a few hundred feet in front of the ground troops. The panel could be spotted by the aircraft and therefore an identification of the area to be attacked was made. Of course in heavy jungle and unfavorable weather these panels are very difficult to spot from the air. An additional difficulty is that of identifying the friendly side of the panel. It is quite possible, in the confusion of battle, for aircraft to mistakenly attack friendly troops because of the inability to distinguish friend and foe from the panel alone. Such instances have usually been passed off as being caused by improper instructions from the troops on the ground. However, irrespective of the exact cause the need for a system to eliminate such errors is quite evident because it is obvious that an airstrike against friendly troops can be just as destructive to them as an airstrike against the enemy can be to that enemy. The need for an additional aid to provide a more definite and all purpose identification of the line of division (or intersection) between friend and foe for use by attacking aircraft is therefore quite evident. This invention describes an electronic system which can be used to replace or to supplement the cerise panels or other visual means presently being employed.

The device described herein includes a pair of antenna wires which can be sewn into the edges of a marking panel to provide both electronic and visual indication. The antennas need not necessarily be sewn into a panel, but must be substantially parallel. However, the broad possibilities of the system do not limit it to this application as will become evident as the system is described. The system can also be used as a landing guide for small planes. The two antennas can line the landing strip and the receiver indication will then tell the pilot to which side of the center of the airstrip he is located. In addition to the pair of antennas the ground equipment includes a radio frequency generator, an audio oscillator, a balanced modulator, two output coupling devices to couple the radio frequency energy into the two antenna elements, and a small battery for power supply. Since the devices used are small and simple, and since the required transmission range for the radio frequency energy is small, the battery drain is quite low. The aircraft equipment includes a radio receiver and a phase detection system for yielding an indication of the aircraft's location with respect to the plane passing through the line located equidistant between the two antennas and perpendicular to the plane containing the antennas.

It is therefore an object of this invention to provide a system which automatically indicates on which side of a plane which lies between two parallel antennas that a receiver is located. It is another object of this invention to provide a system which includes a transmitter having two parallel antennas and a receiver capable of indicating the phase relationship between the signals as received from said antennas. It is another object of this invention to provide a system which automatically provides the directional location of a receiver from a known space plane but does not yield information relative to the distance from said plane.

Further objects, features, and advantages of the invention will become apparent from the following description and claims when read in view of the accompanying drawings wherein like numbers indicate like parts and in which:

FIGURE 1 is a block diagram of the transmitter used in the inventive system;

FIGURE 2 is a block diagram of the receiver used in the inventive system; and

FIGURES 3a and 3b show vector diagrams useful in explaining the operation of the system.

FIGURE 1 shows a cerise-colored panel 10 into the edges of which are sewn two transmitting antennas 11 and 12. It should be noted that although the antennas are both enclosed in a cloth panel this showing is merely for convenience in explaining one preferred embodiment but is not essential to the inventive system, the only requirement being that the transmitting antennas are arranged in a substantially parallel relationship. A radio frequency oscillator 13 generates a carrier frequency which is coupled to antenna 11 through a coupling device 16. The carrier frequency is therefore transmitted to aircraft 18 through some distance $d_1$ by antenna 11. An audio frequency oscillator 15 is coupled to a balanced modulator 14. Radio frequency oscillator 13 is also coupled to modulator 14. The output of balanced modulator 14 is coupled to antenna 12 by a second coupling device 17. The output of modulator 14 is therefore transmitted to aircraft 18 through distance $d_2$ by antenna 12. It should be noted that coupling devices 16 and 17 include the necessary power amplification to couple the desired transmitting power into the antenna elements. As shown in the drawing the distance between antennas 11 and 12 is approximately $\lambda_c/4$, where $\lambda_c$ is the carrier wavelength. It should be pointed out that the various circuits and components comprising the transmitter shown in FIGURE 1 are of types well-known in the art and therefore the details of the individual circuits need not be discussed.

The receiver used in the inventive system is shown in block diagram form in FIGURE 2. The signals transmitted by both antennas 11 and 12 of the transmitter are received on a receiving antenna 30 and injected into a superheterodyne receiver 31. The I-F output of receiver 31 is injected into phase detectors 32 and 36. Also injected into phase detector 32 is the output of a local oscillator 33. Oscillator 33 receives the output of phase detector 32 through a loop filter 34 such that detector 32, oscillator 33 and filter 34 form a phase locked loop. Phase detector 36 receives the output of oscillator 33 through a 90° phase shift circuit 35. The output of phase shift 35 is therefore in phase with the received carrier signal. Phase detector 36 also receives an input from receiver 31. A third phase detector 37 receives the outputs of phase detectors 32 and 36. As will be evident from the description of the operation hereinafter, the output of phase detector 36 is the demodulated amplitude modulated signal received from the transmitter of FIGURE 1 while the output of phase detector 32 is the demodulated phase modulated signal received from the transmitting system. The output of phase detector 37 is injected into an indicator 38 and the polarity of said output signal gives an indication of which side of a space plane the received system is located. The various circuits and elements used in the receiving system are also of a type well-known in the art and therefore a discussion of the details of said circuits and elements need not be entered into. The circled numbers appearing beside the various conductive lines shown in FIGURE 2 correspond to equation numbers set forth in the mathematical analysis presented hereinbelow and assist in understanding the receiving circuit.

The operation of the system is best described by giving attention to the block diagram of the transmission system as shown in FIGURE 1. A radio frequency signal is generated by R-F oscillator 13 which is coupled to the first antenna 11 through the antenna coupling device 16. The radio frequency signal from oscillator 13 is also passed to balanced modulator 14 where it is amplitude modulated by an audio signal from audio oscillator 15 producing two sidebands symmetrical in frequency about the carrier frequency from oscillator 13. The carrier frequency is suppressed in balanced modulator 14. The pair of sidebands which constitutes the output of balanced modulator 14 is coupled to the second antenna 12 through a coupling device 17. Thus with this simple arrangement the carrier frequency is applied to and drives one of the two antennas while the modulation sidebands drive the other antenna. This constitutes the transmitting portion of the system. The system is adjusted such that the double sideband suppressed carrier signal applied to the second antenna 12 would have its carrier exactly in phase with the carrier on the first antenna 11 if the carrier to the second antenna had not been suppressed in balanced modulator 14. The transmission system is therefore designed such that a receiver which is equidistant from both of the antennas 11 and 12 will receive a normal amplitude modulated wave. Thus any receiver which is located on the perpendicular bisector of the plane between the two antennas will receive a normal amplitude modulated wave. The usefulness of this characteristic in a system is best understood by describing the form of the signal present at any location off the space plane. This is best done by resorting to some simple trigonometric relationships.

Let expression (1) represent the signal applied to the first antenna 11, where A is the peak amplitude of the signal and $\omega_c$ is the carrier frequency in radians per second $$A \sin \omega_c t \qquad (1)$$

Let expression (2) represent the output of the audio frequency oscillator 15

$$B \sin \omega_m t \qquad (2)$$

where B is the amplitude and $\omega_m$ is frequency of the audio oscillator 15 in radians per second. Then the signal applied to antenna 12 is the product of expressions (1) and (2) and may be written as expression (3).

$$X \sin \omega_c t \sin \omega_m t \qquad (3)$$

By use of trigonometric identities expression (3) can be rewritten as $$\frac{X}{2} \cos (\omega_c - \omega_m)t - \frac{X}{2} \cos (\omega_c + \omega_m)t \qquad (4)$$

To accurately represent the signal that may be observed at any point in space the phase shift due to propagation time must be considered. Let $d_1$ represent the distance from the receiving antenna carried on aircraft 18 to the transmitting antenna 11 and let $d_2$ represent the distance from the receiving antenna carried on aircraft 18 to the second transmitting antenna 12. The combined signal received by the receiver from the two transmitting antennas 11 and 12 may be written as shown in expression (5) where the new constants D and E are used to allow for the change in amplitude due to the propagation loss.

$$D \sin \left(\omega_c t - \frac{\omega_c d_1}{C}\right) + \frac{E}{2} \cos \left[(\omega_c - \omega_m)t - \frac{(\omega_c - \omega_m)d_2}{C}\right] - \frac{E}{2} \cos \left[(\omega_c + \omega_m)t - \frac{(\omega_c + \omega_m)d_2}{C}\right] \qquad (5)$$

At the output of the receiver I-F this expression has been changed to the I-F frequency but the phase shifts are still the same as is shown in expression (6) below.

$$F \sin \left(\omega_{if} t - \frac{\omega_c d_1}{C}\right) + \frac{G}{2} \cos \left[(\omega_{if} - \omega_m)t - \frac{(\omega_c - \omega_m)d_2}{C}\right] - \frac{G}{2} \cos \left[(\omega_{if} + \omega_m)t - \frac{(\omega_c + \omega_m)d_2}{C}\right] \qquad (6)$$

In these expressions $$\omega_c d_1 / C$$

is the phase delay of the carrier component due to the propagation time, $$\frac{\omega_c - \omega_m}{C}$$

is the phase shift of the lower sideband due to the propagation time and $$\frac{\omega_c + \omega_m}{C} d_2$$

is the phase delay of the upper sideband due to the propagation time where C is the velocity of propagation (the speed of light). Thus a transmission system has been set up such that the properties of the wave at the receiver are a function of the relative distance from the two transmitting antennas. This will become more evident after a description of the receiving system.

A block diagram of a receiving station for use with the system is shown in FIGURE 2. The receiver 31 consists of all of the components up to the I-F output of a normal superheterodyne receiver. The detection system may be described as follows. Phase detector 32, loop filter 34 and oscillator 33 form a phase locked loop to lock the phase of oscillator 33 90° out of phase with the phase of the carrier frequency component of the received signal. Phase detector 32 furnishes an output which controls the frequency (a derivative of the phase) of oscillator 33. Filter 34 is used to restrict the bandwidth of the phase locked loop so that the output of oscillator 33 is not able to follow any phase modulation components of the received signal due to the modulation by the audio oscillator in the transmitter. The 90° phase shift 35 provides an oscillator signal which is in phase with the received carrier. The output of phase detector 36 is then proportional to the amplitude of the desired signal and contains any amplitude modulation components due to modulation by the audio oscillator 15 in the transmitter. Thus the inputs to phase detector 37 consists of the demodulated amplitude modulation and the demodulated phase modulation. It will be shown that a phase comparison between these two signals provides an indication of the receiver location relative to a plane equidistant from the two transmitting antennas and perpendicular to the plane containing the transmitting antennas.

The mathematical expression for the output of phase detector 32 is obtained by multiplying expression (6), the expression for the I-F signal, by expression (7), the expression for the output of oscillator 33.

$$H \cos \left(\omega_{if} t - \frac{\omega_c d_1}{C}\right) \qquad (7)$$

In the resulting expression the coefficients J and K include the coefficients from expressions 6 and 7 and the phase detector constant.

$$J \sin\left(2\omega_{if} - \frac{2\omega_c d_1}{C}\right) + K \cos\left[-\omega_m t - \frac{\omega_c(d_2 d_1)}{C} + \frac{\omega_m d_2}{C}\right]$$
$$+ K \cos\left[(\omega_{if} - \omega_m)t - \frac{\omega_c(d_2 + d_1)}{C} + \frac{\omega_m d_2}{C}\right]$$
$$- K \cos\left[\omega_m t - \frac{\omega_c(d_2 - d_1)}{C} - \frac{\omega_m d_2}{C}\right]$$
$$- K \cos\left[(2\omega_{if} + \omega_m)t - \frac{\omega_c(d_2 + d_1)}{C} - \frac{\omega_m d_2}{C}\right] \quad (8)$$

The sum terms in expression (8) which contains $2\omega_{if}$ are at approximately twice the I-F frequency and may be easily filtered off and neglected. The two remaining terms may be reduced to expression (9) by use of trigonometric identities.

$$L \sin \omega_m \left(t - \frac{d_2}{C}\right) \sin \frac{\omega_c(d_2 - d_1)}{C} \quad (9)$$

Here, as in the previous manipulations, L has been permitted to absorb the system gain constants.

The output from phase detector 36 is obtained in a similar manner. Expression (6) for the I-F signal is multiplied by expression (10) which represents the reference signal from oscillator 33 and phase shifter 35.

$$M \sin\left(\omega_{if} t - \frac{\omega_c d_i}{C}\right) \quad (10)$$

The resulting expression may be written as (11) where the coefficients M and P are allowed to include system constants as was done previously.

$$M - M \cos\left[2\omega_{if} t - \frac{2w_c d_1}{C}\right]$$
$$+ P \sin\left[-\omega_m t - \frac{\omega_c(d_2 - d_1)}{C} + \frac{\omega_m d_2}{C}\right]$$
$$+ P \sin\left[2\omega_{if} - \omega_m t - \frac{\omega_c(d_2 + d_1)}{C} + \frac{\omega_m d_2}{C}\right]$$
$$- P \sin\left[w_m t - \frac{\omega_c(d_2 - d_1)}{C} - \frac{\omega_m d_2}{C}\right]$$
$$- P \sin\left[(2\omega_{if} + \omega_m)t - \frac{\omega_c(d_2 + d_1)}{C} - \frac{\omega_m d_2}{C}\right] \quad (11)$$

Again the sum terms which include $2\omega_{if}$ may be neglected because their high frequency permits them to easily be filtered from the output of phase detector 36 and expression (11) may then be rewritten as expression (12) by the use of trigonometric identities and the assignment of a new constant Q. The D.C. term is eliminated by the insertion of a series coupling capacitor.

$$Q \sin \omega_m \left(t - \frac{d_2}{C}\right) \cos \frac{\omega_c(d_2 - d_1)}{C} \quad (12)$$

Now note that expressions (9) and (12) are the inputs to phase detector 37 of the receiver block diagram of FIGURE 2. The output of phase detector 37 is determined by the product of expressions (9) and (12) and a phase detector constant. The output is then written as expression (13) where R includes the system constants.

$$R \sin^2\left[\omega_m\left(t - \frac{d_2}{C}\right)\right] \sin\left[\frac{\omega_c(d_2 - d_1)}{C}\right] \cos\left[\frac{\omega_c(d_2 - d_1)}{C}\right] \quad (13)$$

By filtering out all frequencies above $\omega_m$ by use of well-known filters (not shown), expression (13) may be rewritten as expression (14):

$$S \sin \frac{2\omega_c(d_2 - d_1)}{C} \quad (14)$$

Note that $$\frac{2\pi C}{\omega_c}$$

is the free space wavelength of the carrier frequency, $\lambda_c$, so that expression (13) may be rewritten as expression (15):

$$S \sin \frac{4\pi(d_2 - d_1)}{\lambda_c} \quad (15)$$

Note that by restricting the magnitude of $(d_2 - d_1)$ do not exceed $\lambda_c/4$, the sign of expression (15) will be determined by whether $d_2$ is larger or smaller than $d_1$. Therefore, if the distance between antennas 11 and 12 doesn't exceed $\lambda_c/4$ the difference in path length $(d_2 - d_1)$ can never exceed $\lambda_c/4$ and it is possible to determine that the receiver is located to the right or left of a plane midway between the two ground antennas and perpendicular to a plane containing the ground antennas. When the receiver is located on the space plane $d_1 = d_2$ and expression (14) goes to zero.

The phase diagrams shown in FIGURE 3 provide a supplemental explanation to the mathematical description of the system operation.

In FIGURE 3a $\omega_c$ represents the carrier frequency. In FIGURE 3b $\omega_u$ and $\omega_e$ represent the upper and lower sideband frequencies generated by the balanced modulator 14 in the transmitter which are radiated by antenna 12. At a receiving point which is equidistant from the two transmitting antennas, the phase relationship of the sidebands relative to the carrier frequency will remain fixed as transmitted. By using the carrier frequency as a phase reference, if a phase angle $\omega_c t$ is subtracted from each vector, the vector shown in FIGURE 3a can be considered to remain in a fixed vertical position while $\omega_e t$ will rotate clockwise and $\omega_u t$ will rotate counterclockwise at the same rate. The sum of $\omega_u t$ and $\omega_e t$ will always be parallel to the vector $\omega_c t$ so that the sum will be an amplitude modulated wave. If the receiver is closer to antenna 12 than it is to antenna 11, both of the vectors from antenna 12 will be rotated an additional amount counterclockwise from where they are shown in FIGURE 3b so that their sum will lie on a line which is not parallel to the vector $\omega_c t$ of FIGURE 3a. Thus the sum may be broken into in-phase and quadrature components relative to $\omega_c t$. If the receiver is located farther from antenna 12 than it is from antenna 11 the phase of the vectors from antenna 12 will be rotated clockwise from where they are shown in FIGURE 3b. Again their sum will lie on a line which is not parallel to the vector $\omega_c t$ of FIGURE 3a and the sum may be broken into two components, one in-phase component and one quadrature component. In the examples given, the total in-phase components (as long as spacing between antennas doesn't exceed $\lambda_c/4$) always have the same sign while the sign of the quadrature component depends upon whether the receiver is closer to or farther from antenna 11 in comparison to its distance from antenna 12. The receiving system shown in FIG. 2 separates the sideband signals into in-phase and quadrature components relative to the carrier frequency and compares the resulting demodulated quadrature components with the demodulated in-phase components in a phase detector. If the modulation on the quadrature component is in phase with the modulation on the total in-phase component the receiver is closer to one antenna; however, if the modulation on the quadrature component is in phase opposition to the modulation on the total in-phase component the receiver will be closer to the other antenna. Thus there is described an electronic system for dividing the space above a ground transmitter into two halves which may be labeled as the friendly half and the foe half so that an aircraft pilot can tell whether he is above friendly or enemy territory.

In addition to performing the function of separating the friendly area from the unfriendly area, the transmitter of the system discussed may serve as a beacon for an automatic direction finder receiver to point to the transmitter location. This would provide additional information as to the plane's location and would serve as an aid in locating a visible marker panel if it is used. If a frequency of operation of about 75 mc. is selected a panel with the antennas sewn in the edges would be about three feet by six feet. The linear dimensions would vary approximately in inverse proportion to the frequency, although antenna loading schemes could be used to further alter the size.

Another addition which may be made to the system as described here includes the addition of a keyer to key an identification code on either or both of the oscillators of FIGURE 1 to provide identification to be sure that the received signal is coming from an authorized valid source. In addition to this coding a whole series of frequency channels may be used so that a number of transmitters may be used at the same time. The combination of an indication of which side of the demarcation line, the indication of an automatic direction finder receiver and proper frequency selection and coding of transmitters will provide a large step in avoiding air strikes on friendly forces in all kinds of weather and in dense jungle. Although this invention has been described with respect to a particular embodiment thereof, it is not to be so limited, as changes and modifications may be made therein which are within the spirit and scope of the invention as defined by the appended claims.

I claim:

1. A system for identifying the position of an aircraft relative to a known space plane comprising: a transmitter and a receiver; said transmitter comprising: a first and a second antenna, said antennas being no greater than one-fourth of a carrier signal wavelength apart; means for generating a carrier frequency signal; means for coupling said carrier frequency signal to said first antenna; means for generating an audio frequency signal; modulation means receiving said carrier frequency signal and said audio frequency signal for suppressing said carrier frequency and producing a pair of sidebands lying symmetrically around said carrier frequency; means for coupling said sidebands to said second antenna; said receiver comprisng: means for receiving the outputs of said first and second antennas; means for comparing the phase of said sidebands with respect to said carrier and generating a position signal; and indicator means for receiving said position signal, the polarity of said position signal being indicative of the location of said receiver with respect to said space plane.

2. The system of claim 1 wherein said means for comparing comprises a first and a second phase detector coupled to the output of said means for receiving; a phase locked loop for controlling the phase of a reference signal for said first and second phase detector; a third phase detector receiving the outputs of said first and second phase detector; and readout means receiving the output of said third phase detector.

3. The system of claim 1 wherein said first and second antennas are in a horizontal plane and said space plane is the plane forming the perpendicular bisector between said antennas.

4. The system of claim 3 wherein said means for comparing comprises a first and a second phase detector coupled to the output of said means for receiving; a phase locked loop for controlling the phase reference signal for said first and second phase detector; a third phase detector receiving the outputs of said first and second phase detector; and readout means receiving the output of said third phase detector.

5. The system of claim 3 wherein said antennas are arranged in substantially parallel relationship.

References Cited

UNITED STATES PATENTS

| 2,423,305 | 7/1947 | Fletcher | 343—105 |
| 3,277,482 | 10/1966 | Green | 343—105 |
| 3,325,811 | 6/1967 | Earp | 343—105 |
| 3,339,202 | 8/1967 | Earp | 343—105 |

FOREIGN PATENTS

| 683,688 | 12/1952 | Great Britain. |

RICHARD A. FARLEY, *Primary Examiner.*

H. C. WAMSLEY, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,400,397            September 3, 1968

Harris A. Stover

It is certified that error appears in the above identified patent and that said Letters Patent are hereby corrected as shown below:

Column 4, line 26, "$\frac{\omega_c - \omega_m}{C}$" should read -- $\frac{\omega_c - \omega_m}{C} d_2$ --.

Column 5, line 6, "$(\omega_{if} - \omega_m)$" should read -- $(2\omega_{if} - \omega_m)$ --;

line 29, "$\frac{\omega_c d_i}{C}$" should read -- $\frac{\omega_c d_1}{C}$ --.

Signed and sealed this 20th day of January 1970.

(SEAL)
Attest:

Edward M. Fletcher, Jr.            WILLIAM E. SCHUYLER, JR.

Attesting Officer            Commissioner of Patents